United States Patent
Ogawa

[11] 4,053,930
[45] Oct. 11, 1977

[54] METHOD AND DEVICE FOR CODING COMPRESSING VIDEO INFORMATION

[75] Inventor: Mutsuo Ogawa, Tokyo, Japan

[73] Assignee: Ricoh Co., Ltd., Tokyo, Japan

[21] Appl. No.: 429,147

[22] Filed: Dec. 28, 1973

[30] Foreign Application Priority Data

Dec. 31, 1972 Japan .................................. 47-313

[51] Int. Cl.² ............................................ H04N 7/12
[52] U.S. Cl. .................................. 358/133; 358/260; 358/261; 340/347 DD
[58] Field of Search ............. 178/DIG. 3, 6; 358/260, 358/261, 133, 135; 340/347 DD

[56] References Cited

U.S. PATENT DOCUMENTS 3,804,975   4/1974   Abe ..................................... 358/261
3,835,386   9/1974   Court ................................... 178/68

Primary Examiner—Robert L. Griffin
Assistant Examiner—Edward L. Coles
Attorney, Agent, or Firm—Cooper, Dunham, Clark, Griffin & Moran

[57] ABSTRACT

A method and device for compressing run-length codes by inserting discrimination bits which discriminate the run-length codes of black elementary areas from those of white elementary areas, where said discrimination bits are weighted as in the case of the bits of the run-length codes.

8 Claims, 8 Drawing Figures

| RUN-LENGTH | CODE COMPRESSION MODE (1) | CODE COMPRESSION MODE (2) |
|---|---|---|
| 1 | (0) 0 1 | (0) 0 0 |
| 2 | (0) 1 0 | (0) 0 1 |
| 3 | (0) 1 1 | (0) 1 0 |
| 4 | (0) 0 1 (0) 0 0 | (0) 1 1 |
| 5 | (0) 0 1 (0) 0 1 | (0) 0 0 (0) 0 0 |
| ⋮ | ⋮ | ⋮ |
| 8 | (0) 1 0 (0) 0 0 | (0) 0 0 (0) 1 1 |
| 9 | (0) 1 0 (0) 0 1 | (0) 0 1 (0) 0 0 |
| ⋮ | ⋮ | ⋮ |
| 13 | (0) 1 1 (0) 0 1 | (0) 1 0 (0) 0 0 |
| 14 | (0) 1 1 (0) 1 0 | (0) 1 0 (0) 0 1 |
| 15 | (0) 1 1 (0) 1 1 | (0) 1 0 (0) 1 0 |
| 16 | (0) 0 1 (0) 0 0 (0) 0 0 | (0) 1 0 (0) 1 1 |
| ⋮ | ⋮ | ⋮ |
| 20 | (0) 0 1 (0) 0 1 (0) 0 0 | (0) 1 1 (0) 1 1 |
| 21 | (0) 0 1 (0) 0 1 (0) 0 1 | (0) 0 0 (0) 0 0 (0) 0 0 |
| ⋮ | ⋮ | ⋮ |
| 28 | (0) 0 1 (0) 1 1 (0) 0 0 | (0) 0 0 (0) 0 1 (0) 1 1 |
| 29 | (0) 0 1 (0) 1 1 (0) 0 1 | (0) 0 0 (0) 1 0 (0) 0 0 |
| ⋮ | ⋮ | ⋮ |

FIG. I

| RUN-LENGTH | CODE COMPRESSION MODE (1) | CODE COMPRESSION MODE (2) |
|---|---|---|

| FIG. 2A | FIG. 2B |

| FIG. 4A | FIG. 4B |

METHOD AND DEVICE FOR CODING COMPRESSING VIDEO INFORMATION

BACKGROUND OF THE INVENTION

The present invention relates to generally a method and device for coding video information and further compressing the coded video information, and more particularly a method and device for coding each interval (run-length) in which white or black elementary areas continue in succession in video information obtained by scanning a subject copy and further compressing the coded interval or run-length.

There has been recently devised and demonstrated a facsimile system in which the facsimile or video information is transmitted through a commercial telephone subscriber line with a low transmission speed from a transmitter to a receiver. When video information obtained by scanning a subject copy is transmitted through such a commercial telephone line, the transmission time is too long for practical purpose so that there have been proposed various methods for compressing the video information. One prior art method is such that an interval in which black or white elementary areas appear in succession, to be referred to as a "run-length" in this specification, is represented by a binary coded signal, and a discrimination bit "1" or "0" is inserted so that the binary coded signal representing a run-length of white elementary areas may be discriminated from that of a run-length of black elementary areas. However, a large number of discrimination bits which are not associated with the coding of run-lengths are contained in the transmitted signal as redundant bits so that the code compression ratio is low.

In view of the above, one of the objects of the present invention is to provide a method and device for weighting the discrimination bits "1"s and "0"s as in the case of the weighted bits in the coded run-length.

According to one embodiment of the present invention, a run-length of white or black elementary areas in video information is counted by a run-length counter. When a black elementary area changes to a white elementary area or vice versa, the content in the counter is read out in response to high-speed clock pulses and transferred into a transmitter buffer. In this case, a bit in each of specific bit positions in the buffer is replaced by a discrimination bit discriminating white or black elementary areas from black or white elementary areas.

BRIEF DESCRIPTION OF THE DRAWING

FIG. 1 is a table of some examples of the binary coded signals representing run-lengths according to the methods of the prior art and the present invention;

DESCRIPTION OF THE PREFERRED EMBODIMENT

Figure 2A:
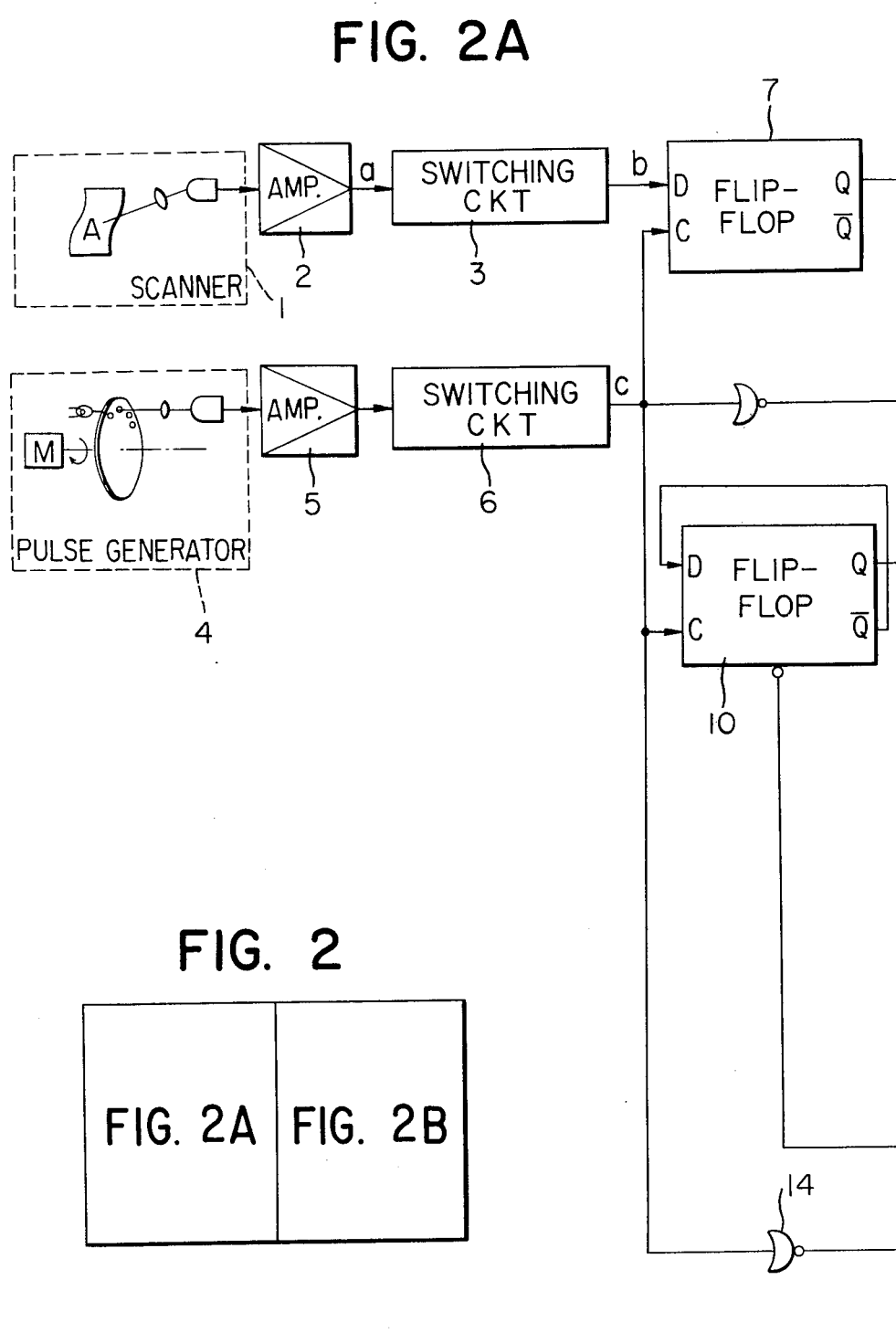
FIG. 2 comprises FIGS. 2A and 2B and is a block diagram of a facsimile transmitter incorporating the present invention.

First referring to FIG. 1, the underlying principle of the present invention will be described. When a run-length of white or black elementary areas is represented by a pure binary number and discrimination bits are inserted between every two bits in a bit group, white elementary areas which continue for instance 20 bits in succession may be given by bit pattern:⓿0 1⓿0 1⓿0 0 where
- ⓿ = discrimination bit representing white elementary areas, and
- ① = discrimination bit representing black elementary areas.

It is seen that 20 bits representing 20 white elementary areas in succession may be represented only by 9 bits. In general, the code compression uses the following weights in order to weight the bits representing the run-lengths:

$$2^7\ 2^6\quad 2^5\ 2^4\quad 2^3\ 2^2\quad 2^1\ 2^0 \qquad (1)$$
⓿ ☐ ☐ ⓿ ☐ ☐ ⓿ ☐ ☐ ⓿ ☐ ☐

Furthermore, the discrimination bits are weighted in the following manner:

$$2^6\ 2^7\ 2^6\ 2^4\ 2^5\ 2^4\ 2^2\ 2^3\ 2^2\ 2^0\ 2^1\ 2^0 \qquad (2)$$
⓿ ☐ ☐ ⓿ ☐ ☐ ⓿ ☐ ☐ ⓿ ☐ ☐

Then 20 bits representing 20 white elementary areas may be compressed as follows:

bit pattern:⓿1 1⓿1 1

That is, 20 white elementary areas may be compressed in code to only six bits so that the code compression ratio may be improved, as compared with the code compression method given by Eq. (1). In order to represent black elementary areas, the discrimination bit① is inserted instead of the discrimination bit⓿.

Instead of the code compression method given by Eq. (2), the following code compression method may be used:

$$2^3\ 2^3\ 2^2\ 2^2\ 2^2\ 2^1\ 2^1\ 2^1\ 2^0\ 2^0\ 2^0 \qquad (3)$$
⓿ ☐ ⓿ ⓿ ☐ ⓿ ⓿ ☐ ⓿ ⓿ ☐

The run-lengths of white elementary areas coded by the above three code compression methods are shown in FIG. 1. It is readily seen that the compression ratio may be considerably improved when the data compression method (2) or (3) is employed than when the code compression method (1). In case of the code compression method (2), the compression ratio may be remarkably improved especially when the run-length is longer while the compression ratio may be improved when the run-lengths are relatively shorter in case of the code compression method (3). In general the run-lengths of white elementary areas of pictures or images are longer than those of black elementary areas so that it is readily seen that when the code compression method (2) is used to represent the run-lengths of white elementary areas while the code compression method (3) is used to represent the run-lengths of black elementary areas, the code compression of video information may be remarkably improved.

Figure 2:
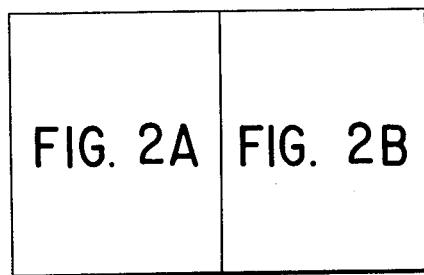
Figure 2B:
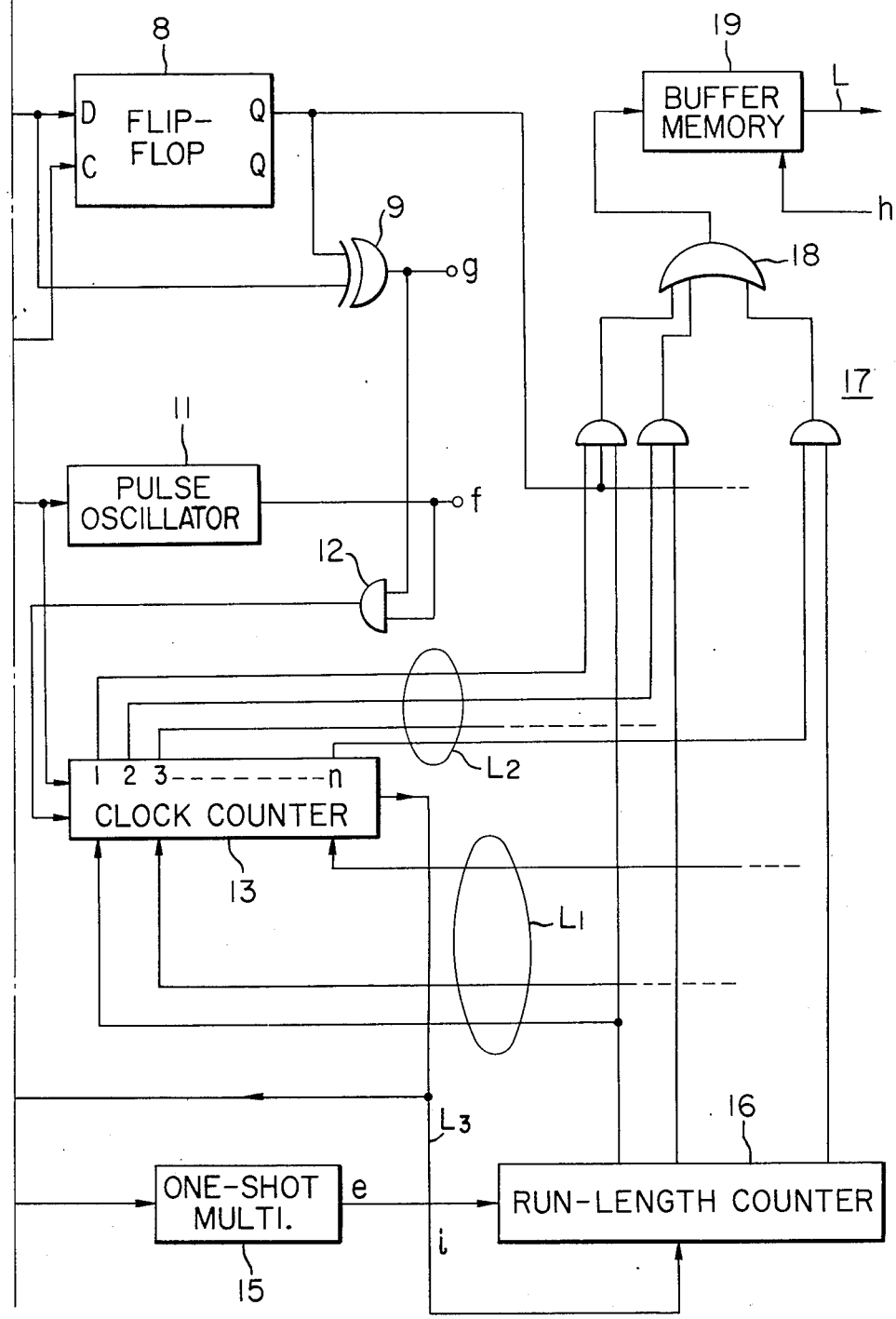

FIG. 2 shows in block diagram a facsimile transmitter incorporating the code compression method in accord with the present invention. The data transient, that is the transient from a white elementary area to a black elementary area or vice versa is detected by the comparison with the data which is delayed by one-half of pulse-recurrence frequency of quantization pulses from the quantized video information. A run-length is counted between the data transient and transferred into a buffer register together with a discrimination bit. The repetition rate of clock pulse which are used for coding is considerably higher than that of the pulses used for quantization, so that the coding is accomplished within one pulse-recurrence frequency of quantization pulses.

Figure 3:
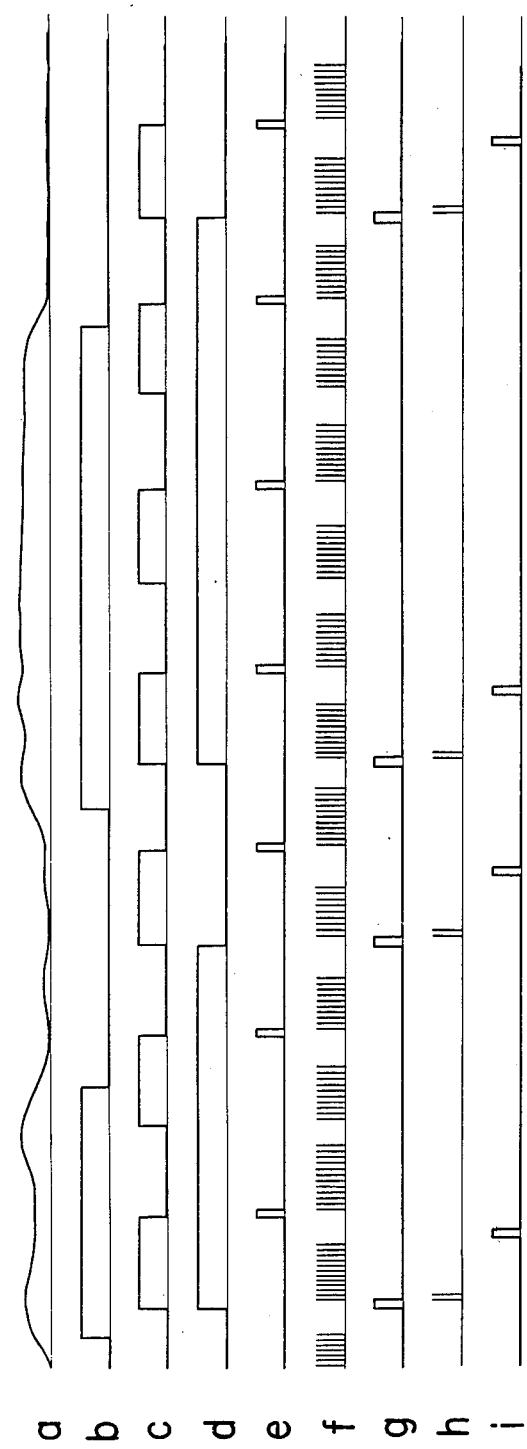
FIG. 3 is a time chart used for the explanation of the mode of operation thereof.

Next referring to FIGS. 2 and 3, the mode of operation of the facsimile transmitter will be described hereinafter. The output of a scanner 1, which scans a subject copy A, is amplified by an amplifier 2 as shown at (a) in FIG. 3 and shaped by a switching circuit 3 as shown at (b) in FIG. 3. The timing pulses which are generated by a pulse generator 4, amplified by a pulse amplifier 5 and shaped by a switching circuit 6 as shown at (c) in FIG. 3 are used as pulses for quantization to be referred as "quantization pulses" in this specification. A flip-flop 7 is adapted to quantize the video information $b$ in response to the leading edges of the quantization pulses $c$ as shown at (d) in FIG. 3. A second flip-flop 8 is adapted to provide in response to the trailing edges of the quantization pulses $c$ the video information which is delayed from the quantized video information $d$ by one half of a pulse-recurrence frequency of quantization pulses. The output of the second flip-flop 8 is used as a discrimination signal for discriminating white or black elementary areas.

The quantization pulses are transmitted through an inverter 14 to one-shot multivibrator 15 so that the run-length counting pulses as shown at (e) in FIG. 3 may be produced. The counting pulses $e$ are transmitted to a counter 16 which counts the run-length of white or black elementary areas of the master copy A.

A flip-flop 10 is set in response to the leading edge of the quantization pulse and is reset in response to the trailing edge thereof so that a high-frequency pulse oscillator 11 is actuated. The repetition rate of the output pulses of the high-frequency oscillator 11 is higher than that of the quantization clock pulses $c$ as shown at ($f$) in FIG. 3.

When the quantized video information $d$ changes from "0" to "1" or from "1" to "0", an exclusive OR gate 9 provides a logic "1" signal, which is transmitted through a gate 12 in response to the output pulse $f$ of the oscillator 11 to a clock counter 13 as shown at (g) in FIG. 3. The clock counter 13 is connected through output lines $l_1$ to specific digit positions, that is, the positions of the discrimination bit "1"s or "0"s of the run-length counter 16. The signal on the line $l_1$ designates the number of steps of the counter 13 so that when the latter counts a predetermined number of bits, it automatically stops counting. In synchronism with the steps of the counter 13, "1" signals are sequentially transmitted through output lines $l_2$ so that corresponding gates 17 are opened. Therefore, the contents in a predetermined number of digit places in the run-length counter 16 are transferred in serial through the corresponding gates 17 and an OR gate 18 into a transmission buffer 19.

The output of the flip-flop 8 is also connected to specific gates 17 so that when the output of the flip-flop 8 is "0" or "1", the binary bit "0" or "1" is forced to be stored in the digit place in the buffer 19 which corresponds said specific gate 17. Therefore, the discrimination bit "0" or "1" is provided. When the counter 13 has counted a predetermined number of pulses, it provides a reset signal on an output line $l_3$ so that both the flip-flop 10 and the run-length counter 16 are reset. Thereafter, the run-length counter 16 starts counting from the next counting pulse $e$ transmitted from the one-shot multivibrator 15.

In FIG. 3, the shift pulses transmitted to the buffer 19 in synchronism with the stepping of the counter 13 are shown at ($h$); and the reset pulse transmitted through the output line $l_3$ from the counter 13 is shown at ($i$). The content of the buffer 19 is transmitted through a line L at a predetermined rate.

Figure 4A:
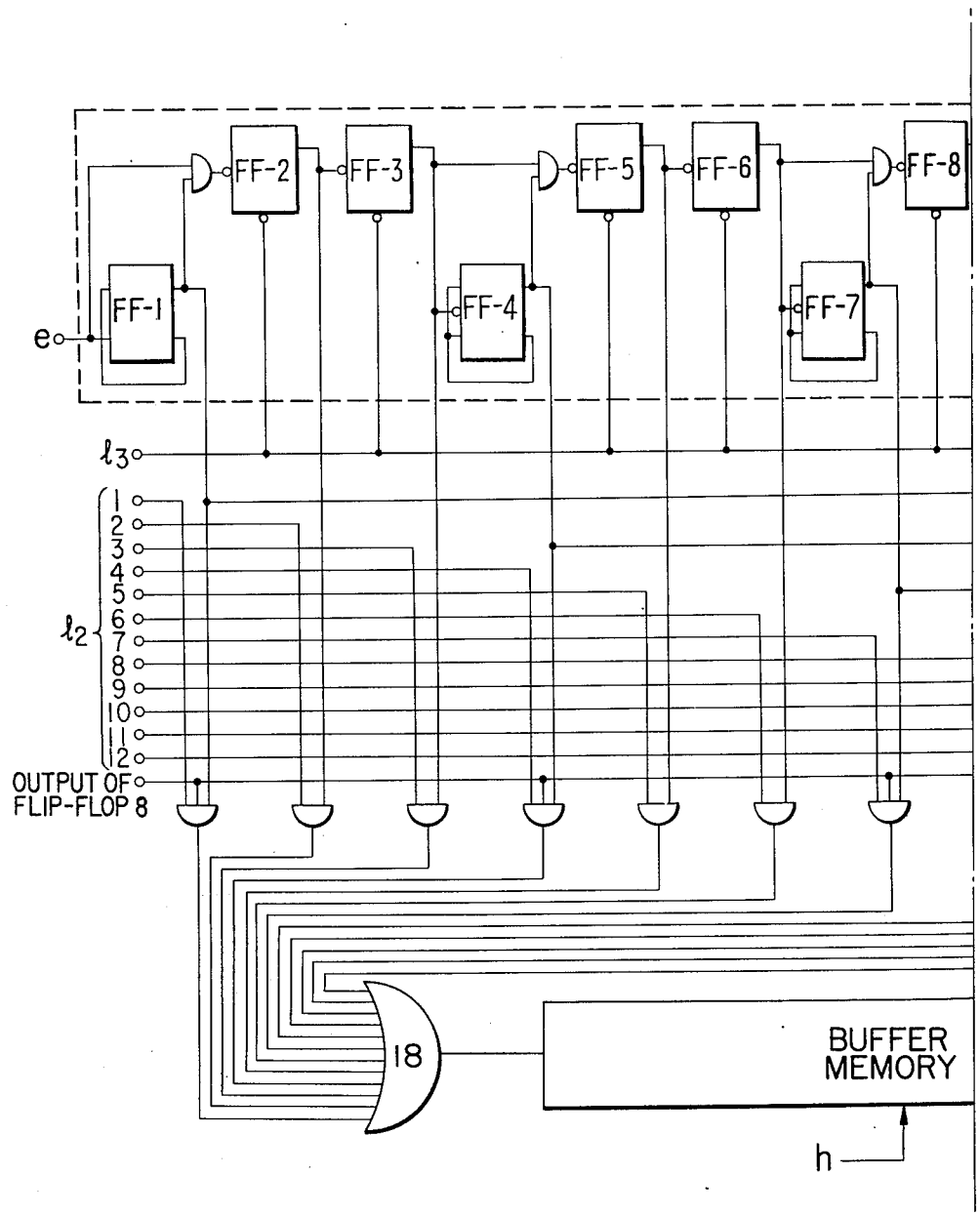
FIG. 4 comprises FIGS. 4A and 4B and is a detailed diagram of a run-length counter and its associated circuits forming a part of the transmitter shown in FIG. 2.
Figures 4, 4B:
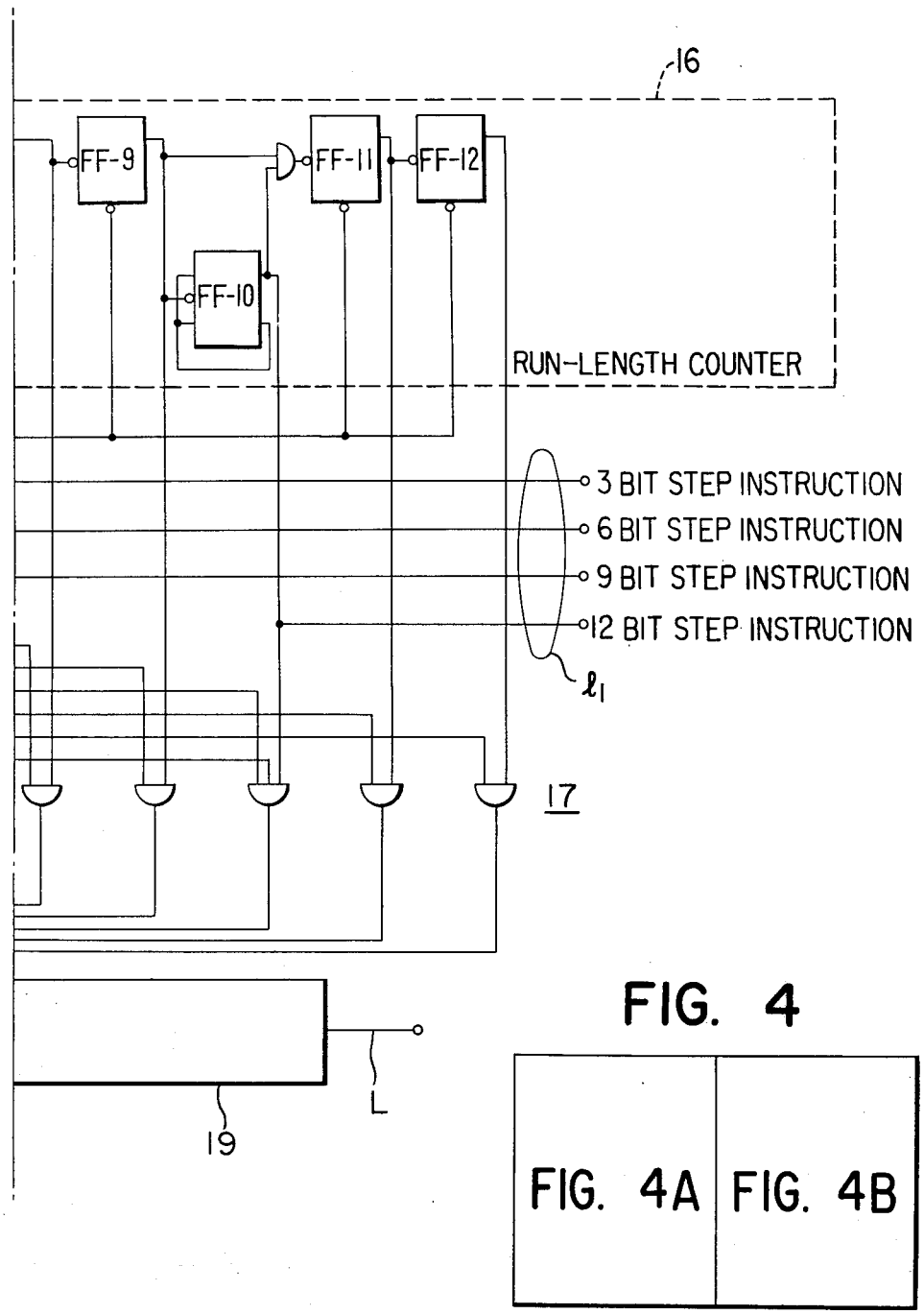

FIG. 4 is a detailed circuit diagram of the counter 16 with its associated circuit components. As described above, the counter 16 is stepped in response to the output $e$ of the one-shot multivibrator 15, and is cleared in response to the reset pulse transmitted through the output line $l_3$ from the counter 13. The run-length counter 16 is so arranged as to step based upon the code compression method (2) shown in FIG. 1. That is, flip-flops 1, 4, 7 and 10 and correspond to the bit places where discrimination bits appear. In response to the signals transmitted through the output lines $l_1$, the counter 13 (See FIG. 2) stops counting after having counted three bits when only the flip-flop $FF_1$ is set. In this case, the logic "1"s are sequentially transmitted only through the output lines $l_{2-1}$, $l_{2-2}$ and $l_{2-3}$, and the contents in the flip-flops $FF_1$ $FF_2$ and $FF_3$ are transferred into the buffer 19 through the AND and OR gates 17 and 18. However, instead of the content of the flip-flop $FF_1$, the content of the flip-flop 8 (See FIG. 2) is transferred into the position of the content of the flip-flop $FF_1$ in the buffer 19 as the discrimination bit. In like manner, when the flip-flop $FF_4$ is set, the six-bit step instruction is transmitted through the output line $l_1$ to the counter 13. In like manner, when the flip-flops $FF_7$ is set, the counter 13 counts 9 bits, and when the flip-flop 10 is set, the counter 13 counts 12 bits as will be readily understood from the foregoing description.

What is claimed is:

1. A method for coding and compressing video information comprising the steps of
   a. representing by a coded signal each run-length of white or black elementary areas which appear in succession in video information,
   b. replacing a bit in at least one bit place in said coded signal with a discrimination signal which discriminates said coded signal as a signal representing white or black elementary areas, and
   c. weighting said discrimination bits by the same weights used for weighting the bits of the coded signals representing run-lengths.

2. A method as defined in claim 1 wherein the bits in the bit positions of the coded signals spaced apart by a predetermined number of bit positions from each other are replaced by said discrimination bits.

3. A method as defined in claim 1 wherein the discrimination bit representing the black elementary areas is a logic "1" while the discrimination bit representing the white elementary areas is a logic "0".

4. A device for coding and compressing video information comprising
   a. a counter adapted to count run-lengths of black and white elementary areas in video information;
   b. detecting means adapted to detect whether a run-length which is being counted by said counter, is that of black or white elementary areas based upon said video information;

c. detecting means adapted to detect a transition point at which a white elementary area changes to a black elementary area or vice versa;
d. means adapted to read out the content of said counter in response to the output of said transition point detecting means; and means adapted to replace a bit or bits of said read out content spaced apart from each other by a predetermined number of bits with a discrimination bit or bits.

5. A system for coding a video information signal derived by scanning a subject copy comprising:

means for providing a digital signal representing the video signal in run-length coding, each digital signal representing the run-length of white or black elementary areas of the subject copy scanned in succession and each digital signal comprising a plurality of bits and having a defined radix, each bit position corresponding to a defined power of the radix of the digital signal;

means for deriving a discrimination bit corresponding to each digital signal and indicating whether the digital signal represents the run-length of white or of black elementary areas; and means for combining each discrimination bit with its corresponding digital signal to derive a composite digital signal formed by at least one discrimination bit and one other bit, the bit position of each discrimination bit corresponding to a defined power of said radix and the run-length represented by the resulting composite digital signal being indicated both by the position of any discrimination bit forming a part of said composite signal and by any bit stored in any remaining bit position of the composite signal.

6. A system as in claim 5 where any two adjacent discrimination bits of the composite signal are spaced from each other by a defined number of bit positions in the composite signal.

7. A method of coding a video signal derived by scanning a subject copy comprising the steps of:

providing a succession of digital signals, each digital signal representing the run-length of a succession of white or black elementary areas of the scanned subject copy and each comprising a plurality of bits, each bit position corresponding to a defined power of a defined radix;

deriving a discrimination bit corresponding to each digital signal and indicating whether the digital signal represents the run-length of successive white or of successive black elementary areas; and combining each discrimination bit with the corresponding digital signal to form a composite digital signal formed partly of one or more discrimination bits and partly of one or more other bits, each bit position of a discrimination bit in said composite signal corresponding to a defined power of the radix and the run-length represented by the composite signal being partly indicated by the position of each discrimination bit forming a part of the composite signal and partly by the content of the one or more remaining bit positions of the composite signal.

8. A method as in claim 7 wherein each two adjacent discrimination bits forming a part of the composite signal are spaced apart by a defined number of other bits.

* * * * *